April 9, 1963  D. S. STEVENS  3,084,591
METHOD OF AND MEANS FOR DETERMINING THE AVERAGE SIZE OF PARTICLES
Filed March 3, 1958
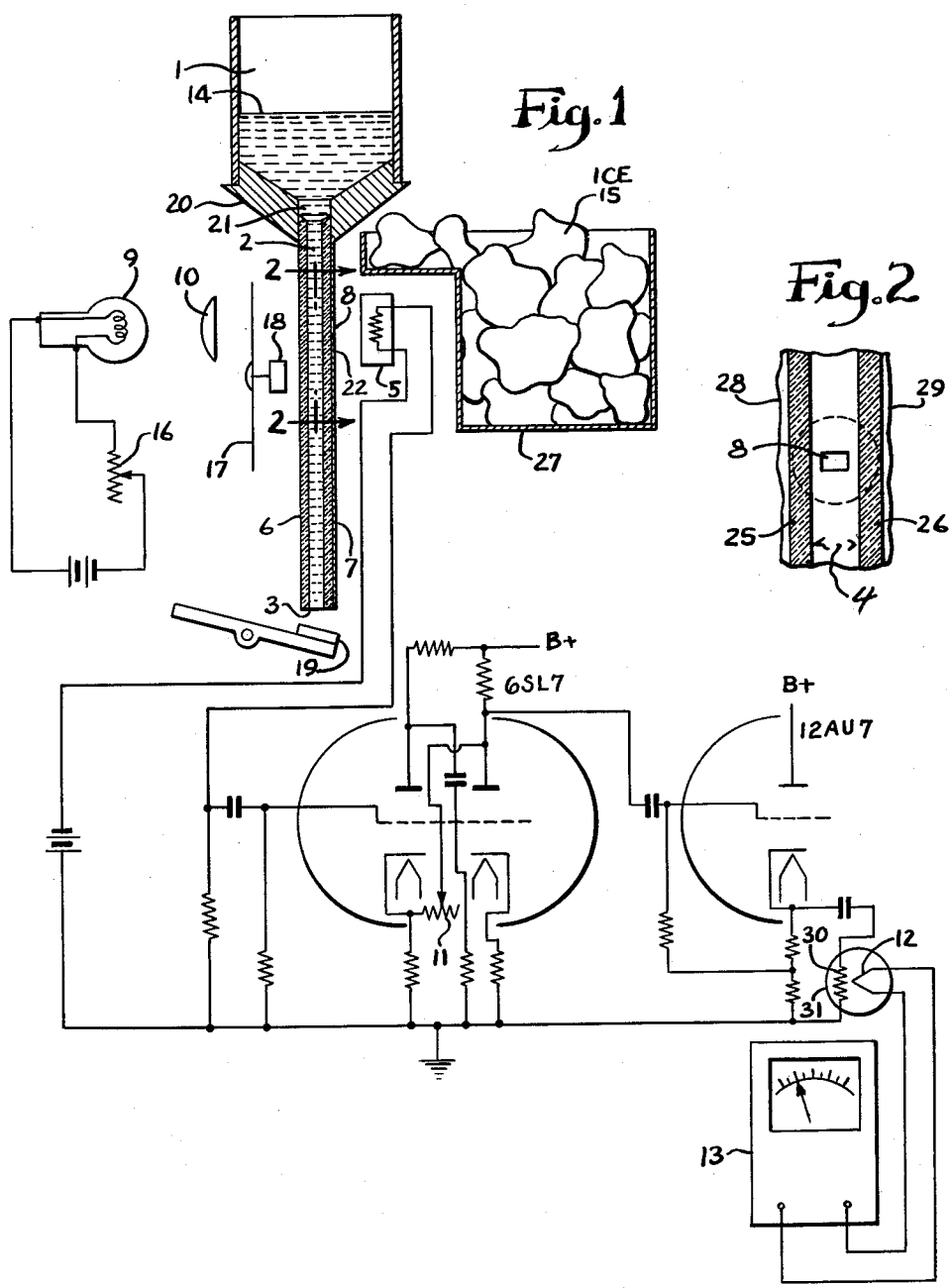
INVENTOR
DANIEL S. STEVENS
by: Morris Spector
ATTY.

United States Patent Office

3,084,591
Patented Apr. 9, 1963

3,084,591
METHOD OF AND MEANS FOR DETERMINING THE AVERAGE SIZE OF PARTICLES
Daniel S. Stevens, 1515 W. Monroe St., Chicago, Ill.
Filed Mar. 3, 1958, Ser. No. 718,740
10 Claims. (Cl. 88—14)

This application is a continuation-in-part of my copending application Serial No. 448,955 filed August 10, 1954.

This invention relates to a device for determining the mean corpuscular volume of particles and a method for determining the number of particles in a unit volume of a particle sample.

The principal object of this invention is to provide a simple, reliable device which will determine the mean corpuscular volume, hereinafter referred to as MCV, of particles suspended in a liquid. Since dry powders can usually be suspended in a test liquid, this device has broad application.

A further object is to provide a device in which the particles pass through a light beam for the purpose of producing light pulses with intensities proportional to the volume of each particle producing a pulse.

A further object is to convert these light pulses into electrical pulses whose energy is integrated in a suitable electrical circuit to give an average reading on an output meter, proportional to the MCV of the particle sample.

A further object is to provide a device which derives information from the effects of a large number of particles passing through the light beam with all possible orientations to give an accurate value of the MCV.

Another object is to provide a method of standardizing the electrical circuit to avoid errors from drift in the electrical circuit.

A schematic view of this invention is shown in the drawings, in which:

FIGURE 1 shows a view, partly in section, showing a chamber allowing a flow of the particle suspension to pulse a light beam and the circuitry for converting light pulses into electrical pulses.

FIGURE 2 shows a view along section 2—2 of FIGURE 1 to illustrate the optical aperture in front of the photocell.

Most particle samples are an aggregate of particles of many sizes and shapes. The average particle size, or mean corpuscular volume, is expressed in volumetric units, such as cubic microns. This value can be used to specify the sample.

The MCV of a sample of human blood is an important figure, used to determine whether the blood is normal or if a pathological condition is present. Samples of normal human blood have a MCV in the range of 80 to 100 cubic microns, and 90 cubic microns is usually given as the MCV of normal bood. In the presence of microcytic anemia, the MCV may decrease to 60 cubic microns, and in macrocytic anemia the MCV may increase to 130 cubic microns. The standard method used to determine red blood cell MCV is troublesome to perform and the results are subject to well-known error. The novel and useful features of the present invention will be understood from a description of its operation.

When this invention is used to determine the MCV of a dry powder, a weighed amount of the powder is suspended in a suitable liquid and the suspension is allowed to flow through a narrow chamber traversed by a beam of light. The particles in the suspension pulse the light beam. The pulses are detected by a photocell. The pulses in the photocell current are amplified and read on an output meter. The construction and method of operation of my invention allows the scale of the output meter to be calibrated in terms of MCV by using several samples of powder having known MCV's.

Blood cells cannot be weighed in the form of a dry powder so that some other standard of reference is required. This invention uses the novel method that all red blood cell samples are diluted to give suspensions with the same optical absorption of red light before the blood cell suspensions are allowed to flow through my device. In particular, I have found that a suspension of normal red blood cells with an MCV of 90 cubic microns and having a concentration of 16 million red cells in each cubic centimeter of 1% sodium chloride solution, is suitable for the operation of this invention. This suspension has a red light absorption of 41% when read in a suitable instrument, for instance a photoelectric colorimeter using 12 mm. diameter colorimeter tubes. This reading is recorded and all red blood cell samples are diluted with 1% sodium chloride solution to give this reading on the colorimeter scale before using the suspension in this device. A user of this invention will, of course, prepare the reference suspension of 16 million normal red cells per cubic cm. and determine the exact scale reading in his own brand of colorimeter, since there will be some variation of the scale reading for different diameters of colorimeter tubes and colorimeters of varying mechanical construction.

The absorption of the red blood cell suspensions for red light is used because the hemoglobin pigment in the red blood cells is transparent to red light and variations in the hemoglobin content of the cells do not affect the readings obtained on the colorimeter. The amount of red light absorbed is a function of the number and MCV of the cells present in the suspension.

To use this invention, a red blood cell suspension prepared with the specified optical absorption is placed in reservoir 1 shown in FIGURE 1. The blood cell suspension then flows down into chamber 2. Chamber 2 has a dimension 3 of 70 microns, which causes the blood cells to flow in a thin stream as viewed by the active surface of photocell 5. Dimension 4 of chamber 2 is 5 millimeters, a distance sufficient to allow steady flow of the cell suspension through chamber 2.

Chamber 2 is fabricated from two flat pieces of clear glass, 6 and 7 separated by spacers 25 and 26 formed of a fluorocarbon resin sold under the trademark Teflon. These spacers have a thickness of 70 microns. The sides 28 and 29 of the chamber 2 are sealed in a liquid tight manner by a coating of epoxy cement. Chamber 2 is held in a rectangular hole 21 of rubber fitting 20 with a liquid tight fit. Rubber fitting 20 also forms a liquid tight seal with glass reservoir 1.

The outside surface of plate 7 is provided with coating 22, which is opaque to light except for a small aperture 8 which is transparent to light.

This optical construction is obtained in the following manner: Aperture 8 has a width of 80 microns and a height of 20 microns. To manufacture such an aperture, a glass master plate is first coated with an opaque film of aluminum metal. A skilled engraver then engraves a transparent opening 80 microns by 20 microns through the aluminum film. The engraved plate is then laid against a photographic plate with the aluminum film in contact with the photographic emulsion. Light is directed against the engraved plate and a contact print is made on the photographic emulsion. This contact print is transparent except for a small opaque rectangle of dimensions 80 by 20 microns. The outside of the glass plate 7 is coated with a film of photographic emulsion 22. The contact print is now laid with its emulsion side against emulsion film 22 on plate 7. Light is directed on this assembly from the side of the contact print. This exposes emulsion film 22 and upon development, film 22 will become opaque except for the area of 80 by 20 microns forming transparent aperture 8. (Guides are cemented to the contact print so that aperture 8 has the position on plate 7 shown in FIG. 2.)

Aperture 8 receives strong illumination from lamp 9 and lens 10. Rheostat 16 is set so that lamp 9 operates at a proper voltage. The blood cells flowing across aperture 8 absorb some of the light passing through aperture 8, which causes pulses in the current of photocell 5. Photocell 5 is a conductive lead sulphide cell that is especially suited for my device because of its low noise output. Ice cubes 15 in container 27 can be used to maintain the photocell at a low temperature. The output of the lead sulphide cell decreases with increasing temperature, so that the output signal at temperatures above 100° F. is difficult to amplify by the electronic circuit. The ice bath provides a temperature around the photocell close to 40° F. At this temperature the output signal of the photocell is high and the internal noise is low.

The voltage pulses of photocell 5 are amplified approximately 500 times by an electronic tube of the 6SL7 type. This tube is connected in a two stage amplifier, whose output voltage is readily adjusted by the setting of rheostat 11. The output of the 6SL7 tube is connected to the grid circuit of a 12AU7 type of electronic tube. The 12AU7 tube provides a cathode-follower circuit of sufficient power to operate the heater wire 30. The junction of thermocouple 12 is welded to heater wire 30 and 12 and 30 are assembled in an evacuated glass bulb 31. The thermoelectric current generated by thermocouple 12 is read on meter 13.

The thermocouple and meter used to indicate the output of the electronic circuit is an important feature of this invention since these two devices together integrate electrical energy which is proportional to the light pulses produced by the flow of the particle sample. The blood cells flow across aperture 8 at the rate of 1000 to 2000 per second. Meter 13 requires 12 seconds to reach full scale deflection after electrical current is allowed to pass through the thermocouple heater. The long period of the thermocouple meter provides a meter reading which corresponds to the average energy given by the pulses from several hundred blood cells flowing across aperture 8.

It will be understood that the amount of light absorbed by a blood cell is proportional to the volume of the blood cell traversed by the light beam. Furthermore, a normal red blood cell is an irregular body in the shape of a biconcave disc, with diameter 7.7 microns and thickness varying from 1 micron at the center section to 2.4 microns at the edge. In pathological conditions, the red blood cells have abnormal shapes. This condition is called poikilocytosis. To obtain the mean volume of such an irregular body, it is necessary for the light beam to traverse the red blood cell from all possible directions and then measure the average amount of light that has been absorbed. This invention provides these requirements in a novel manner.

The dimensions of chamber 2 allow the blood cell suspension to flow in a ribbon-like stream. The blood cells can orient themselves in any manner with respect to aperture 8 and the light beam. This kind of flow is necessary for this device. The passage of several hundred blood cells will give all manners of orientation and the integrating of the resulting electrical pulses by the thermocouple meter will give a reading proportional to the mean corpuscular volume of the cells intercepting the light beam. The light beam passes through a chamber with flat sides and the blood cells as viewed by the photocell are not distorted, as is the situation with the use of a tubular flow chamber. Furthermore, the rate of cell flow across aperture 8 is rapid, giving about 1000 pulses per second to the light beam. This fast rate of flow provides the large number of pulses per second which are integrated to give the reading obtained on the thermocouple meter.

The method of calibrating and using my invention will now be given. A sample of normal blood of known red blood cell count and an MCV of 90 cubic microns is readily obtained, using methods to determine these values available in blood laboratories. This blood sample is now diluted with 1% sodium chloride solution to give a suspension containing 16 million red blood cells in each cubic centimeter. The amount of red light absorbed by this suspension is now determined by reading the light absorption in a photoelectric colorimeter. A record is made of this reading, which will be approximately 40% of the instrument scale. Blood samples with other known MCV's are now obtained. A sample with MCV of 65 cubic microns and another sample with MCV of 125 cubic microns will be used to determine the scaling of meter 13. These last two blood samples are diluted with 1% sodium chloride solution until suspensions are obtained that give the same absorption to red light, when read in the colorimeter, as obtained with the sample of 90 cubic micron MCV.

The batteries operating lamp bulb 9, photocell 5 and the electronic tube amplifier are now connected to their proper terminals. The electronic circuit is stable with respect to drift, but a means of easily standardizing this circuit with a source of pulses, must be provided. This is accomplished by fan 17 rotated by synchronous motor 18 to chop the light beam. Fan 17 is made from a slender wire of 1 mm. diameter. When fan 17 is rotating, voltage gain control 11 is adjusted so that meter 13 will have a definite deflection, such as 100 mm. Flow of any blood cells across aperture 8 must be stopped during this standardizing procedure, by pressing soft rubber fitting 19 against the outlet of flow chamber 2. Fan 17 is rotated only during the standardizing procedure.

The three blood cell suspensions which have been prepared according to the directions outlined are now allowed to flow through chamber 2 in succession and the readings of meter 13 are recorded, as follows:

*Table 1*

| MCV of red blood cells in suspensions used for calibration: | Reading of meter 13, mm. |
|---|---|
| 125 | 128 |
| 90 | 83 |
| 65 | 46 |

The MCV of an unknown blood is obtained by diluting the blood sample with 1% sodium chloride solution to give the same red light absorption as the calibrating suspensions and then allowing the unknown suspension to flow through this device. The reading of meter 13 then gives the unknown MCV on reference to the calibration chart prepared from Table 1. The amount of suspension placed in reservoir 1 is sufficient to reach the level of line 14 so that all samples flow through chamber 2 under the same hydraulic head.

The volume of suspension viewed by photocell 5 is equal to the area of aperture 8 multiplied by the thickness 3 of chamber 2. This volume is 20×80×70 or 112,000 cubic microns. This volume contains approximately 2 red blood cells, when the blood cell suspension is made with 16 million red blood cells per cubic centimeter.

The calibrating blood cell suspension has also been prepared with 8.4 million red blood cells (of 90 cubic microns MCV) per cubic centimeter of 1% sodium chloride solution, which suspension has a red light absorption of approximately 25%. The volume of the flowing suspension viewed by photocell 5 at any instant will contain on the average one blood cell when this standardizing suspension is used. The readings obtained on meter 13 for blood suspensions prepared in this manner, are given:

*Table 2*

| MCV of red blood cells: | Reading of meter 13, mm. |
|---|---|
| 125 | 65 |
| 90 | 45 |
| 65 | 30 |

Comparison of Tables 1 and 2 shows the advantage of using suspensions that give two red blood cells in the chamber volume opposite photocell 5. The scaling of the instrument is expanded twice as much for the same range of MCV's because two blood cells pulse the light beam more strongly than does one blood cell. This increased signal is greatly desired because of the weak pulses given by the blood cells.

It will be noted that in this device the blood cells can be scanned more than one at a time and also the cells can be viewed with all possible orientations. These are novel and useful features not present in previous inventions.

Previous inventions allow the blood cells to settle in a chamber and then scan the cells one at a time to obtain the mean cell diameter. This procedure does not give the MCV which is needed for medical diagnosis and which is given by my invention. Blood cells have been flowed through a very narrow capillary tube for counting purposes. The curvatures of the capillary will distort the appearance of the blood cells and their orientation on flow through such a narrow capillary is not known. Such a device cannot provide the accurate results needed for the laboratory determination of MCV, which should be accurate to 5%.

In case the number of blood cells in a cubic millimeter which is the count, is desired, the following method can be used. Using a normal blood sample, make suspensions containing various concentrations of blood cells. Read these suspensions in the colorimeter and obtain a calibration curve for the scale of the colorimeter in relation to the concentration of blood cells in each suspension.

An unknown blood may be diluted in a known dilution ratio and read in the colorimeter. From the calibration curve, the concentration or count of blood cells in the sample can be determined, provided the blood cells are normal in mean corpuscular volume. In case the mean corpuscular volume of the unknown blood sample, differs from the normal value of 90 cubic microns, the following formula can be used to give the count of the unknown blood sample:

$$\frac{\text{Count from calibration curve} \times 90}{\text{MCV of the blood sample}}$$

For determining the MCV of dry powders, a convenient technique can be used that does not involve the use of a colorimeter. Several samples of dry powder are obtained having known mean corpuscular volumes extending over the range under test. The same weight of each powder sample is suspended in a suitable volume of liquid. By trial, a weight of powder is decided that will form a suspension, giving a good deflection to meter 13. These suspensions are then used to calibrate my instrument in units of MCV. The MCV of an unknown powder can be determined by suspending the standard weight of powder in the liquid and observing the reading obtained on meter 13.

In compliance with the requirements of the patent statutes I have here shown and described a preferred embodiment of the present invention. What is considered new and sought to be secured by Letters Patent is:

1. An apparatus for determining the average size of particles in a suspension of predetermined optical density comprising: means forming a chamber for said suspension having cross sectional dimensions such that the particles are substantially smaller than the volume of said chamber, a light source and a photoelectric device positioned respectively on opposite sides of said chamber, at least a part of the walls of the chamber being transparent to form a light transmitting path through the chamber, the light beam from said source passing through said chamber and striking said photoelectric device, means forming a light aperture interposed in the path of the light beam which passes through said chamber, which aperture is sized and located to provide a field spaced from both lateral edges of said chamber, and a fluid reservoir positioned above said chamber and being in communication therewith whereby said particles in said suspension flow into said chamber and across said aperture to pulse said light beam creating pulses in the current of said photoelectric device that are proportional to the volumes of the particle units, and means coupled to said photoconductive device to amplify said pulses and integrate the average energy therein with respect to time, said measurement indicating the average size of the particles of said suspension.

2. Apparatus for determining the average size of the particles in a suspension of predetermined optical density: comprising means forming a chamber for said suspension, said chamber having cross sectional dimensions such that the particles are substantially smaller than the volume of said chamber, a light source directing a beam through said chamber, a photoelectric device positioned to receive the beam passing through said chamber, means forming a light aperture interposed in the path of said light beam which provides a field such that relative movement between the light beam and said suspension will pulse the light beam as dispersed particle units pass across said field with the pulses being proportional to the volumes of the particle units, means for providing relative movement between said particles in suspension and said light beam, and means coupled to said photoelectric device to amplify the pulses in the output thereof and to integrate the energy therein with respect to time to determine the average value of the energy with respect to time and thus to determine the average size of the particles in said suspension.

3. An apparatus for determining the average size of particles in a suspension of predetermined optical density comprising: means forming a chamber for said suspension, said chamber having a cross sectional area such that particles are widely dispersed therein, a light source and a photoelectric device disposed respectively on opposite sides of said chamber-forming means; the part of the chamber-forming means nearest said light source having a transparent region, and the part of the chamber-forming means nearest said photoelectric device having a light transmitting aperture in registration with said photoelectric device, said light source and said transparent region to form a path for the light energy from said light source; said aperture and said chamber at the aperture being of such dimensions as to form a volume of suspension containing at least two of said particles; means for causing said suspension to flow through said chamber and across said aperture to pulse said light beam, creating pulses in the current of said photoelectric device that are proportional to the volumes of the particle units, and means including an integrating circuit coupled to said photoelectric device to amplify said pulses and measure the integrated energy therein, said measurement indicating the average size of the particles of said suspension.

4. An apparatus for determining the mean corpuscular volume of a suspension of particles comprising means forming a chamber with transparent walls and entrance and exit openings, said chamber having a cross sectional area providing flow of said particles at random orientations in said suspension, said chamber constricting the flow of said suspension to a ribbon-like stream with said particles widely dispersed therein and said chamber having a cross-sectional size sufficient to permit the passage of clusters of particles; a light source and photocell means positioned respectively on opposite sides of said chamber whereby light rays from said source pass through said dispersed stream of particles to reach said photocell, means forming an aperture interposed in said light beam to restrict illumination to a volume of flowing suspension containing a limited number of said particles, means to effect substantially uniform flow of said particles to cause pulses in the output of said photocell means, electrical means coupled to said photocell means to integrate said pulses and indicate the rate that energy is received from said pulses.

5. Means for determining the mean corpuscular volume of a suspension of particles of predetermined optical density comprising means forming a passageway adapted to provide a flow of said particles at random orientations in said suspension, means forming a light beam directed transversely through the passageway, said particles in said suspension pulsing the light beam, photocell means converting said light pulses into electrical pulses, and electrical means including an integrating circuit responsive to the rate of receiving energy from said electrical pulses for providing a reading proportional to the mean corpuscular volume of the particles in said suspension.

6. Apparatus for determining the average size of the particles in a suspension of predetermined optical density: comprising means forming a chamber for said suspension, a light source directing a beam through said chamber, a photoelectric device positioned to receive the beam passing through said chamber, light aperture means interposed in the path of said light beam which provides a field such that relative movement between the light beam and said suspension will pulse the light beam as dispersed particle units pass across said field with the pulses being proportional to the volumes of the particle units, means for providing relative movement between said particles in suspension and said light beam, and means coupled to said photoelectric device to amplify the pulses in the output thereof and to integrate the energy therein with respect to time to determine the average value of the energy with respect to time and thus to determine the average size of the particles in said suspension.

7. A method of measuring the mean corpuscular volume of red blood cells, said method comprising diluting a red blood cell sample to form a red blood cell suspension having a known optical absorption of monochromatic light, passing said suspension through a restricted passageway so that the cells pass through said passageway at random orientation, traversing the flowing suspension with a beam of light to cause the beam of light to pulsate by having a portion of the light to be absorbed by the random oriented cells, which portion is proportional to the volume of the blood cells traversed by said beam of light, converting the pulses in the beam to electrical pulses, and integrating the electrical pulses with respect to time and thereby provide an indication of the mean corpuscular volume of the cells.

8. A method of determining the average size of particles in liquid suspension of such particles, said method comprising flowing said suspended particles through a restricted chamber, traversing said flowing suspension in said chamber with a beam of light to cause the beam of light to pulsate by having a portion of the energy of the beam absorbed by the particles, which portion is proportional to the volume of the particles traversed by the beam, and integrating the total energy in said pulses in a manner to determine the average value thereof with respect to time, thereby to provide an indication of the average size of the particles.

9. Apparatus for measuring the average size of the particles in a suspension of such particles, said apparatus comprising means forming a passageway adapted to provide flow of said suspended particles therethrough, means providing a beam of energy directed through said passageway, said suspended particles pulsating the beam of energy such that the pulses are proportional to the volume of the particles flowing through the passageway, means converting the pulses into electrical pulses, and electrical means including an integrating circuit responsive to said electrical pulses for integrating the energy therein with respect to time to determine the average value of the energy with respect to time and thus to determine the average size of the particle in said suspension.

10. A method of determining the mean corpuscular volume of a suspension of particles of pre-determined optical density, which method comprises causing a flow of said particles in suspension through a restricted passageway so that the particles have approximately the same relative size distribution during flow through said passageway, traversing said flowing suspension with a beam of energy to cause the beam of energy to pulsate by having a portion of the energy of the beam absorbed by the particles, which portion is proportional to the volume of the particles traversed by the beam, converting the pulses in the beam to electrical pulses, and integrating the energy in said electrical pulses in a manner to determine the average value thereof with respect to time, thereby to provide an indication of the mean corpuscular volume of said particles.

References Cited in the file of this patent

UNITED STATES PATENTS

| | | |
|---|---|---|
| 2,369,577 | Kielland | Feb. 13, 1945 |
| 2,379,158 | Kalischer | June 26, 1945 |
| 2,519,997 | Brown | Aug. 22, 1950 |
| 2,731,202 | Pike | Jan. 17, 1956 |
| 2,732,753 | O'Konski | Jan. 31, 1956 |
| 2,775,159 | Frommer | Dec. 25, 1956 |
| 2,779,232 | Small | Jan. 29, 1957 |
| 2,791,150 | Stevens | May 7, 1957 |
| 2,812,686 | Sinclair | Nov. 12, 1957 |
| 2,875,666 | Parker et al. | Mar. 3, 1959 |

FOREIGN PATENTS

| | | |
|---|---|---|
| 540,133 | Canada | Apr. 30, 1957 |